United States Patent [19]
Bonnefous

[11] Patent Number: 6,159,151
[45] Date of Patent: Dec. 12, 2000

[54] METHOD FOR THE PROCESSING OF SIGNALS RELATING TO AN OBJECT HAVING MOVING PARTS AND ECHOGRAPHIC DEVICE FOR CARRYING OUT THIS METHOD

[75] Inventor: Odile Bonnefous, Nogent-sur-Marne, France

[73] Assignee: U.S. Philips Corporation, New York, N.Y.

[21] Appl. No.: 09/195,085

[22] Filed: Nov. 18, 1998

[30] Foreign Application Priority Data

Nov. 18, 1997 [EP] European Pat. Off. ............. 97402771

[51] Int. Cl.⁷ ..................................................... A61B 8/06
[52] U.S. Cl. .......................................................... 600/440
[58] Field of Search .................................. 600/453–456, 600/440–441; 73/861.25

[56] References Cited

U.S. PATENT DOCUMENTS

| | | | |
|---|---|---|---|
| 4,370,985 | 2/1983 | Takeichi et al. | 128/663 |
| 5,579,771 | 12/1996 | Bonnefous | 600/450 |
| 5,622,174 | 4/1997 | Yamazaki | 600/455 |
| 5,800,356 | 9/1998 | Criton et al. | 600/441 |
| 5,891,040 | 4/1999 | Grenon et al. | 600/455 |
| 5,910,117 | 6/1999 | Basoglu | 600/455 |

OTHER PUBLICATIONS

"CVI challenges Doppler in Vascular pathology" by M. Claudon, D.M., in "Diagnostic Imaging International, vol. 7, pp. 61–65, 1991, Miller Freeman Publication".

*Primary Examiner*—Francis J. Jaworski
*Attorney, Agent, or Firm*—John F. Vodopia

[57] ABSTRACT

The invention concerns a signal processing method comprising: the acquisition of a first and a second set of data formed from signals respectively relating to first and second moving parts of an object having moving parts, and the construction on the basis of said first and second sets of data of a sequence called a sequence of color velocity images with superimposed graphics which is formed from a sequence of intensity images in which said intensity images are provided with color coded representations of velocity zones of said first moving parts and with schematic graphic representations reproducing the movements of said second moving parts. The invention also concerns an ultrasonic apparatus carrying out said method.

14 Claims, 4 Drawing Sheets

METHOD FOR THE PROCESSING OF SIGNALS RELATING TO AN OBJECT HAVING MOVING PARTS AND ECHOGRAPHIC DEVICE FOR CARRYING OUT THIS METHOD

BACKGROUND OF THE INVENTION

1. Field of the Invention

The invention relates to a signal processing method including steps for acquiring signals relating to an object having moving parts, and steps for constructing a sequence of images on the basis of said signals. The invention also relates to an echographic device for carrying out this method.

2. Description of the Related Art

The invention is used in the field of medical echographic imaging, for providing cardio-vascular diagnostic tools for non-invasive study of anomalies of arteries and notably of stenoses. A diagnostic criterion for a stenosis is an abrupt reduction of an artery diameter. Another criterion is the blood velocity in the stenosed zone. Studies have shown that the behavior of blood in a stenosed artery does not satisfy Bernouilli's law concerning fluid flows in a sense that flow velocity does not increase in conformity with said law in the zone in which the artery diameter decreases. To the contrary, the blood flow velocity decreases as soon as the artery diameter reaches a stricture threshold. Consequently, the artery gradually becomes completely occluded in the zone which is first only constricted, ultimately causing a thrombosis phenomenon. Rigid plaques can also appear in the layers of the arterial walls causing changes of the wall elasticity and ultimately causing so large wall tensions that during the cardiac cycle the arterial wall is distorted to the point of rupture and may emit emboli.

Therefore, the medical field has a need for non-invasive means for studying arteries, notably stenosed arteries, in order to find an explanation for this behavior.

A method for determining blood flow velocity by Color Velocity Imaging noted CVI is already known from a publication entitled "CVI challenges Doppler in Vascular pathology" by M. CLAUDON, D. M., in "Diagnostic Imaging International, Vol. 7, pp.61–65, 1991, Miller Freeman Publication". This paper discloses that Color Velocity Imaging is a new non-Doppler ultrasound technique for vascular flow color imaging. The first imaging technique called Doppler calculates flow velocity indirectly by measuring the frequency shift and the phase shift variations from the original transmitted frequency pulse of the Doppler transducer. These shifts are caused by movement of blood cell clusters. A physical limitations of this principle is that the transmitted central probe frequency also shift due to uncontrollable phenomena linked with tissue structure which disturbs the accuracy of the blood velocity computation. Color Doppler systems minimise this error by averaging a high number of measurements, which results in decreasing the number of color lines being processed, in order to obtain an acceptable frame rate. Spatial and true hemodynamic resolutions are reduced and therefore the degree of clinical information available is limited. In addition the use of longer pulse lengths reduces the axial resolution of color Doppler images as compared to gray-scale images.

Instead of measuring the frequency shift as in Doppler imaging technique, the second imaging technique called CVI, measures flow velocity directly by using time domain processing. CVI tracks individual clusters of blood cells using ultrasound to measure the distance and the time travelled. CVI is based on the principle of signature recognition. In a time domain correlation process, a first echo is stored in digital memory. The shape of signal traces the relative position of blood cells which is called ultrasound signature of the cluster. Some microseconds later, a second echo signal is stored. A computing system analyses the two signal signatures by time shifting these two signatures until they match perfectly. This time shift is directly related to the distance the blood cells have moved, using the speed of sound in tissue. Blood-cell velocity is obtained by dividing this measured distance by the time between the two corresponding ultrasound pulses. Correction of the cosine angle between the vessel axis and the ultrasound beam is the same as with Doppler systems. The velocity computations are coded in shades of red and blue according to the direction of blood flow. Unlike Color Doppler, CIV measures peak velocities instead of mean velocities. CVI needs only a few averaging calculations to reach a high degree of accuracy and consequently a high frame rate is maintained without reducing the number of color lines. This provides higher spatial and hemodynamic resolutions and more clinical informations.

As explained before, it is of importance that indications of the actual movements of the walls be available together with the blood flow velocity in order to diagnose stenoses or other diseases. However neither the CVI method nor the Color Doppler method provides indications of the radial velocity of the arterial walls or of the amplitude of the actual movements of the walls or of the dilation of the artery in function of the phases of the cardiac cycle.

A technical problem resides in the fact that processing data to provide arterial wall radial velocity together with processing data to provide CVI for example are actually incompatible because the respective velocities of arterial walls and blood flow are in the ratio of one to about fifty.

SUMMARY OF THE INVENTION

The problem is solved by means of a method as disclosed in claim 1. This method offers the advantage that the graphic lines make the arterial wall velocity readily accessible, and the arterial wall behaviour clearly visible, together with color coded indications of the blood flow velocity. So the physician may easily diagnose stenosis and other arterial abnormalities and study the various parameters which are related to these diseases.

This method offers the advantage that it may be carried out with color coded velocity images which are provided either by Color Doppler Imaging or by CVI. However, preferably this method is carried out by an echograph including a system as disclosed in claim 9, which constitutes a tool for diagnosing arterial wall abnormalities by accurately visualising the operation of the different moving parts of an artery in the vicinity of a suspect zone during a cardiac cycle.

BRIEF DESCRIPTION OF THE DRAWING

Specific embodiments of the invention will be described in detail hereinafter with reference to the accompanying diagrammatic drawings; therein.

DETAILED DESCRIPTION OF THE PREFERRED EMBODIMENTS

Figure 1:
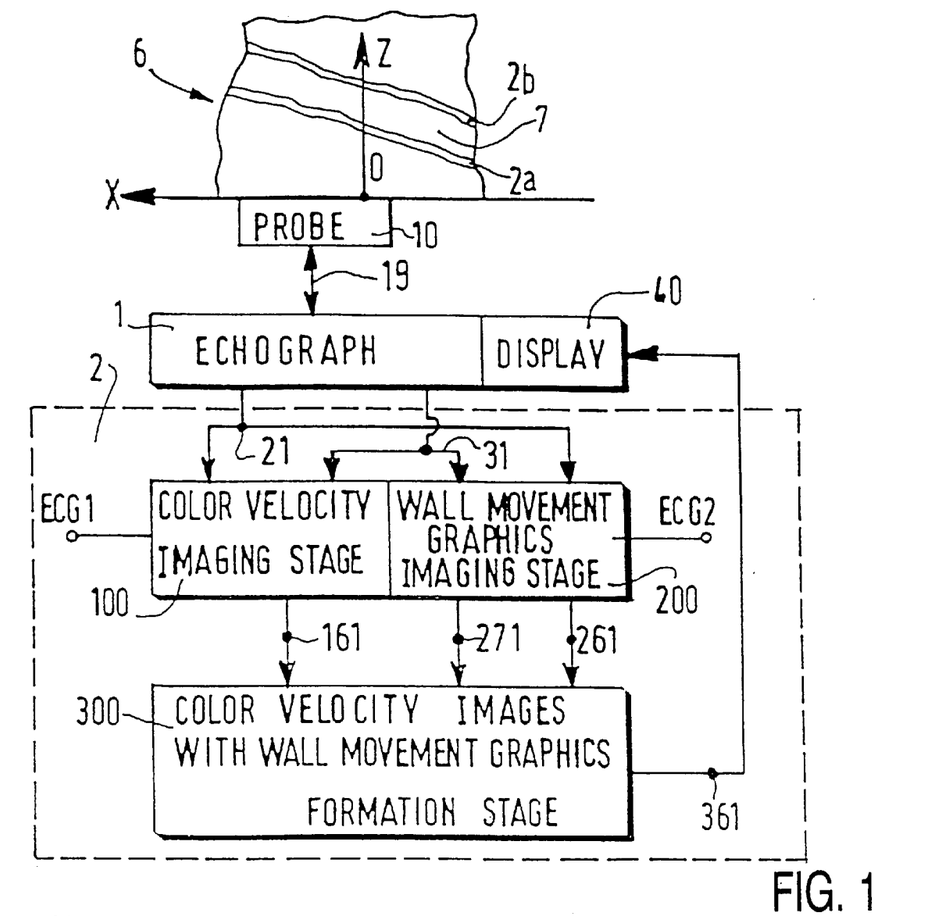
FIG. 1 shows a functional block diagram of an echograph having an echographic system to carry out the invention.

FIG. 1 shows an ultrasonic echographic apparatus 1 having a probe 10, and provided with an echographic system 2 and display means 40. The device 10, 1, 2, 40, constitutes a tool for the formation and display of a sequence of images in which graphic lines representing wall movements of an artery are superposed on color coded blood flow velocity images. For that purpose the echographic system 2 comprises a first sub-system 100 for providing a sequence of images 161 representing color coded velocity indications of blood flow, a second subsystem 200 for providing a sequence of images 261, 271 representing graphics of the wall movements, and a subsystem 300 for synchronising the images of both sequences and providing a sequence of images 361 where the graphics of the wall movements are superposed upon the colored representations of the blood flow velocities.

As an alternative, the echographic system may comprise a subsystem 400 (FIG. 5) which combines the functions of the first and second subsystems 100, 200, receives the same inputs, and outputs the same image sequences.

The operation of the echograph 1 involves an ultrasound probe 10 in contact with a medium 6 observed for transmitting, via periodic excitations, ultrasonic signals to the medium scanned, in a direction OZ, and for receiving, in the same direction OZ, the echoes 19 returned by the obstacles encountered in the medium. The probe 10 may be composed of ultrasonic transducers which are assembled in a linear array having an orientation OX. A respective transmitting/receiving line corresponds to an acoustic beam generated at a corresponding position. In the embodiment described with reference to FIG. 2, the ultrasound probe 10 is connected to a transmitter/receiver stage 20 which comprises a generator for generating the excitation signals applied to said probe. The probe transducers convert these signals into periodic train of ultrasound pulse signals controlled by clock signals which are supplied with a predetermined recurrent frequency. The returned acoustic signals are received and combined by the stage (20) to perform beam formation. Other control signals are further supplied by the transmitter/receiver stage 20 to control the probe 10 and the velocity estimation stages 130, 230, 430 (FIGS. 3, 4, and 5) included in subsystems 100 and 200 or 400.

Figure 2:
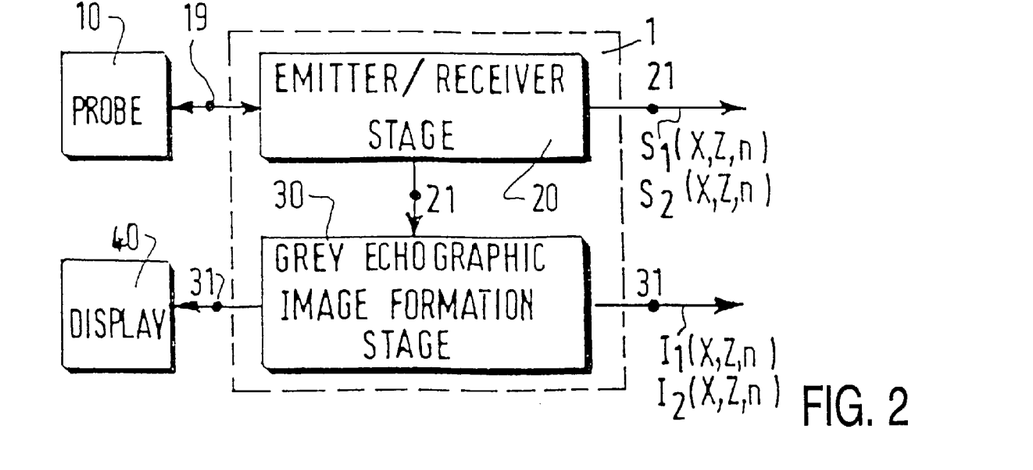
FIG. 2 shows a functional block diagram of the echograph by itself.

During the transmission step the medium is scanned along the directions of the excitation lines. In the receiving mode the image of each excitation line is formed, taking into account the propagation time in the medium and the amplitude of the echoes returned by the obstacles encountered along the excitation line considered. The transmitting operation of each excitation line of the probe 10 thus provides acoustic high-frequency signals S(X,Z,n) 21 which enable the formation, as a function of the instant n, of a sequence of intensity images I(X,Z,n) 31 by way of a stage of image formation 30, n being the number of the image of the sequence.

Figure 3:
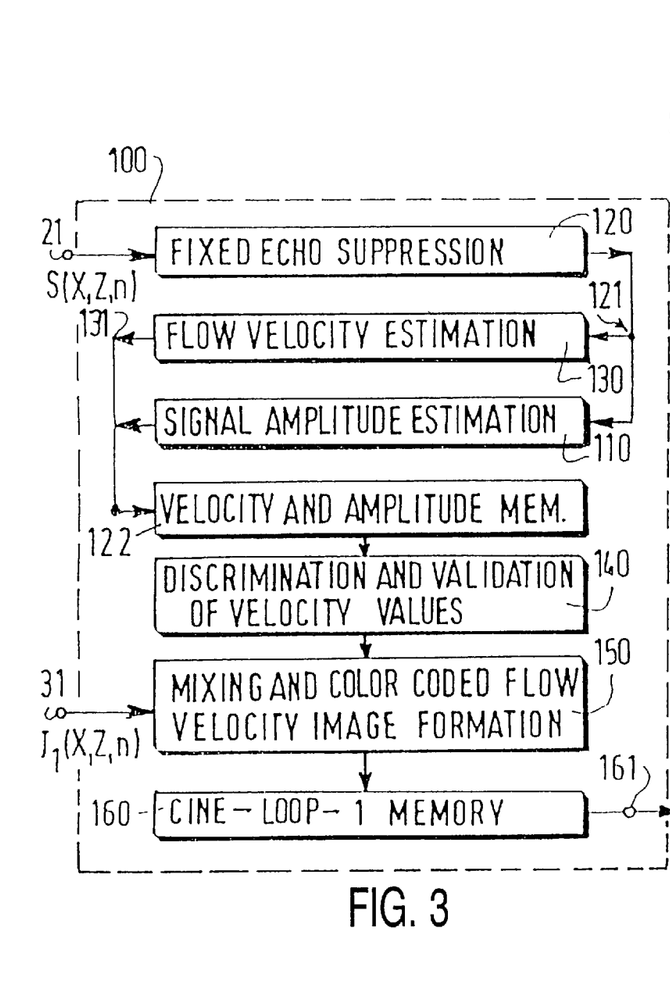
FIG. 3 shows a functional block diagram of a first subsystem of said echographic system for constructing blood flow velocity images (CVI)

Referring to FIG. 3, a first sub-system 100 of the echographic system 2 for the processing of high-frequency signals 21 $S_1$ (X,Z,n) produced by the transmitter/receiver stage 20 at a first rate, is coupled to the echograph 1 in order to permit operation thereof in a color coded velocity imaging mode which enables determination of the blood flow velocities in different parts of an artery. A system for providing such images is already known from the U.S. Pat. No. 4,803,990 (BONNEFOUS).

The first echographic sub-system 100 comprises a fixed echo suppression stage 120 for suppressing fixed echoes and those which are considered fixed, notably those caused by reflection of the ultrasound waves from the arterial walls in which the blood flow being studied occurs. The presence of said fixed echoes must be eliminated because their amplitude is much higher, about 40 dB in the case of arterial walls, than that of the signal useful for determining blood flow velocity, that is to say the signals which are returned by moving clusters of blood cells.

The first sub-system 100 further includes a flow velocity estimation stage 130 for estimating blood flow parameters. On the basis of difference signals labelled $d_i(t)$, $d_{i+1}(t)$... between two successive echographic lines which are successively supplied by the fixed echo suppression stage 120, the flow velocity estimation stage 130 supplies correlation function values, and on the basis on these values, said flow velocity estimation stage 130 supplies parameters which characterise the different flow velocities encountered along the axis of propagation of the ultrasound wave. These parameters are the axial component of the blood flow local mean velocity $V_1(Z,X,n)$ and the local variation $\sigma^2$ thereof which is defined by the complement to 1 of the correlation peak value. In this context, the word local is used to indicate the location in the depth along the Z axis of propagation.

The flow estimation stage 130 performs the correlation function computation (1) defined by:

$$F_i(J, P) = \sum_{k=1}^{k=K} d_i((k+J)\Delta t) \cdot d_{i+1}((k+J+P)\Delta t) \quad (1)$$

where F is the correlation function; J determines the start of the time window having a length $K\Delta t$; P represents the time shift introduced between two successive signals $d_i$ and $d_{i+1}$ for which the correlation function value is calculated, P varying in steps of 1; i represents the rank of the difference between two successive echographic lines labelled $e_i$ and $e_{i+1}$ corresponding to $d_i$ and $d_{i+1}$.

The correlations are controlled by the sequencer of the transmitter/receiver stage 20 and are preferably formed by 1-bit correlators which offer the advantage that the principal correlation peak obtained is triangle-shaped which is suitable for linear interpolation. The correlation functions or the formation of the mean value thereof are supplied to an interpolator which may be formed by a microprocessor or a table. The interpolator operates as follows: during a first step the maximum value is selected from all the correlation function values; with this value are associated the two adjacent correlation function values and these three values enable the reconstruction of the principal correlation peak. The abscisse Z(J) of said correlation peak enables determination of the local velocity $V_1(Z,X,n)_{Z_O}$ at the depth $Z_0=(Jt)/2$:

$$V_1(Z,X,n)_{Z_O} = C\frac{Z(J)}{2T} \quad (2)$$

and the amplitude $F_{MAX}$ of said peak enables the determination of the variation $$\sigma_{Z_O}^2$$

according to:

$$\sigma_{Z_O}^2 = B\left(1 - \frac{F_{MAX}(t)}{K}\right) \quad (3)$$

where B is a proportionality factor.

The subsystem 100 for blood flow velocity processing also comprises an estimation stage 110 of the amplitude of echoes for providing grey images of amplitude $A_1(Z,X,n)$ which also are used in the discrimination stage to validate the signals $V_1(Z,X,n)$ and $\sigma_2$. The data of velocity $V_1(Z,X,n)$ and amplitude $A_1(Z,X,n)$ may be stored in a memory 122.

The output signals 131 of the blood flow velocity estimation stage 130 are validated or rejected by the discrimination stage 140. The discrimination stage 140 is actually used because outside the flow zones the output signal of the fixed echo suppression stage 120 is essentially formed by noise. The result supplied by the blood flow velocity estimation stage 130 which processes this noise is not an indication of a flow velocity zero. Thus, it is necessary to validate or reject this result.

Outside the true flow zones, the amplitude calculated by the estimation stage 110 is that of noise only and can be measured alone in the absence of excitation, thus permitting of determining an appropriate threshold. The amplitude is applied to a comparator which gives a logic level 0 or 1 depending on whether the voltage received on its input is lower or higher than said threshold. The discrimination stage 140 then provides the signals $V_1(Z,X,n)$ and $\sigma^2$ issued from the flow velocity estimation stage 130 or the value zero depending on whether the validation signal is 1 or 0 respectively.

The velocity values of the blood flow are processed in an image formation stage 150 which receives the sequence of grey images 31, or intensity images $I_1(X,Z,n)$ formed at said first rate in the stage 30 of the echograph. In the image formation stage 150, the velocities are color coded, not only in red and blue for indicating the direction of blood flow, but in several hues of several colors, each color indicating a range of velocity, and the intensity of the hue indicating the level of velocity in the range. The colors indicating the velocities are then superposed on the grey images of intensity thus forming a color coded flow velocity sequence of images which are stored in a memory 160 labelled CINE-Loop-1.

Figure 4:
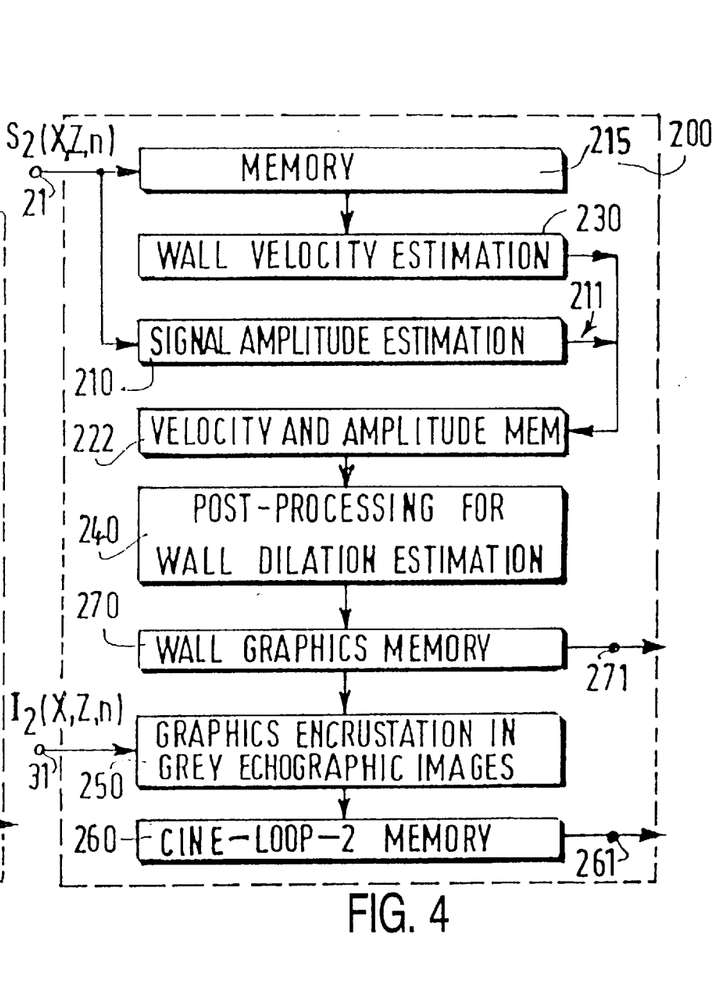
FIG. 4 shows a functional block diagram of a second subsystem of the echographic system for constructing images of graphics representing the arterial wall movements (WM)

Referring to FIG. 4, a second subsystem 200 of the echographic system 2 for the processing of the high-frequency signals $S_2(X,Z,n)$ produced by the emitter stage 20 at a second rate is coupled to the echograph 1 in order to permit operation thereof in a graphic mode which enables observation of the behavior of arterial walls, at instants during a cardiac cycle, while the pulsating wave propagates within the artery 6 (FIG. 7) considered as a waveguide.

Figure 7:
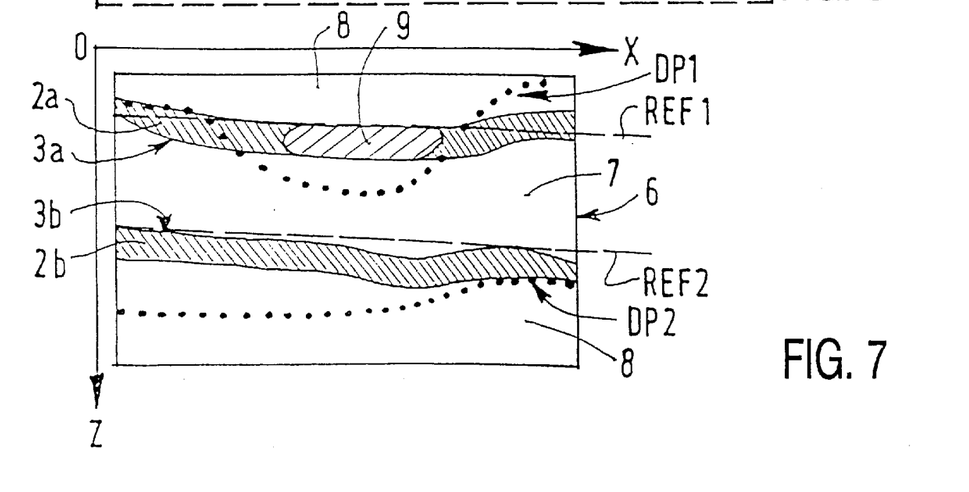
FIG. 7 shows schematically graphic lines representing wall movements (WM) superposed on an echographic image of an artery.

Under the influence of this pulsating wave, the arterial walls 2a,2b are subject to a periodic radial movement whose amplitude and velocity are determined. Depending on the arterial wall state, the pressure variations induced by the pulsating wave create either a uniform arterial dilation or a distorted parietal movement.

Referring to FIG. 7, diagrammatically showing a standard echographic intensity image, the observation of the behavior of the arterial walls involves the examination of the medium by the echographic probe 10 in such a manner that the artery is scanned longitudinally in the direction parallel to OX in order to produce longitudinal cross-sectional intensity images of the artery, enabling the visualisation of the front wall 2a and the rear wall 2b. The excitation lines of direction OZ are the columns of the image.

Referring to FIGS. 4 and 7, the second echographic subsystem 200 includes processing stages which execute steps of forming a sequence of images, including graphic lines DP1, DP2 reproducing the movements of internal parietal boundaries 3a, 3b of an artery segment 6 scanned by the echograph 1, at each scanned point of the parietal boundaries and at given instants n of a cardiac cycle, in conformity with a predetermined spatial amplification scale. These graphic lines fulfill the purpose of enabling the diagnosis of parietal lesions 9, based on the shape and amplitude of the parietal displacements with respect to the normal.

The behaviour of the artery must be observed over a full cardiac cycle. Therefore, a sequence of a number N of images covering a time interval which is at least equal to a cardiac cycle must be formed, N being a number such as $1 \leq N$. So, the behaviour of the artery may be observed in relation to the various phases of the cardiac cycle. Therefore, a time marker which is common to the image sequence and to the cardiac cycle must be identified.

The velocity and the amplitude of the displacement of the walls are first determined in a wall velocity estimation stage 230 which performs a temporal correlation operation in the subsystem 200.

During this temporal correlation operation 230 which is performed according to the same principle as operation 130 of the first subsystem 100 and with equivalent means, the successive ultrasonic echoes, produced by moving biological structures and generated in the transmitter stage 20, are compared by way of their correlation function. The displacement of the biological structures from one ultrasonic emission to the next is estimated while taking into account displacement of the correlation peak corresponding to the delay introduced by this displacement upon reception. The correlation operation 230 provides velocity measurements in the form of two-dimensional velocity images $V_2(X,Z,n)$ which are stored in a memory 222.

Then, the parietal movements are localised during a POST-PROCESSING operation 240 for determining the locations of the arterial walls in corresponding echo amplitude images $V_2(X,Z,n)$ also stored in the memory 222, which are formed by an operation 210 of measuring the amplitudes of echoes, and for transferring the locations of the arterial walls in the velocity images. The echo amplitude images are formed in the stage 210 by equivalent means as used in the stage 110 of subsystem 100. During the POST-PROCESSING operation 240 an adaptable threshold is calculated for each amplitude image 111 $A_2(X,Z,n)$ and is applied to the amplitude images in order to produce digital amplitude images in which the transitions corresponding to the internal parietal boundaries are further smoothed by filtering.

The POST-PROCESSING operation 240 subsequently includes a step for the detection of internal parietal boundaries 3a, 3b. The image is thus scanned along the excitation lines of direction OZ in order to detect the points situated on these boundaries.

Instantaneous mean parietal spatial velocities are then determined and integrated in time in order to provide corresponding parietal displacements. Graphic lines DP1, DP2 formed during post-processing operation 240, simulating the front and rear parietal displacements respectively, are superimposed, during an operation 250, in each image of the sequence of intensity images $I_2(Z,X,n)$ provided by the image formation stage 30 at said second rate. The operation 250 performs the graphic superposition of curves corresponding to the parietal displacements D1 and D2 and of the reference positions REF1 and REF2 on the standard echographic images $I_2(X,Z,n)$ which are further stored in the memory 260 CINE-LOOP-2. The reference lines REF1 and REF2 are derived from the parietal boundary curves extracted from the amplitude images, corresponding to the start of the cardiac cycle of the image sequence, and are calculated by means of a linear regression method which is known per se. The superimposed images provided by the graphic superimposition stage 250 are then stored in a memory 260 labelled CINE-Loop-2. The data for forming the graphic lines DP1, DP2 may also be stored in a memory 270.

The second echographic subsystem 200 is implemented especially for compliance with the range of parietal displacements. The artery segment 6 studied is scanned two-dimensionally, as quickly as possible, and the temporal correlation operation 230 is performed one image after the other in the sequence. The recurrent period is taken to be equal to the image period which is called $T_{FRAME}$. The range of radial velocities $V_2(X,Z,n)$ of the arterial walls is linked to the image period $T_{FRAME}$, to the ultrasonic frequency $f_o$, and to the propagation velocity C of sound in the medium as:

$$V_2(X,Z,n).T_{FRAME}=C/4\ f_o \approx 0.75\ mm \quad (4)$$

while assuming that C=1.5 mm/µs and $f_o$=5 MHz.

The maximum parietal velocity is of the order of 10 mm/s. Consequently, an image period must be of the order of:

$$T_{FRAME} \approx 7.5\ ms \quad (5)$$

This image period $T_{FRAME}$ corresponds to a high image production rate. The recurrent frequency is approximately 15 kHz in the transmission mode. The number of image excitation lines may be, for example 68 or 112 with a scanning step (distance between excitation lines) of 0.5 mm or 0.25 mm, which enables visualisation of an arterial segment of 28 mm. The delay between the signals corresponding to each excitation line of the image may be adjusted by increasing or decreasing the number of excitation lines and the distance between the excitation lines.

Referring to FIGS. 2 and 4, the correlation function is based on the same principle as a method described in the U.S. Pat. No. 5,579,771 (BONNEFOUS). However, the present correlation function is performed between the images of the sequence so that it is necessary to have a memory 215 available at the input of the wall velocity estimation stage 230 for providing the necessary delay between two correlated signals. To enhance the exactness of the measurements, preferably several correlation functions are averaged for example $N_c$=4. Memory 215 contains the 1-bit signals of the $N_c$+1 echographic images.

The resultant wall displacements are processed so as to determine reference instants n1, n2 of the cardiac cycle at which the displacements must be set to zero. A correction is applied to the displacement curves in order to ensure a cyclical behavior of the artery, corresponding to a fixed and stable spatial reference position of the walls at the start of each cardiac cycle.

So, the parietal displacements can be represented in relation to spatial reference positions REF1, REF2 corresponding to the starts of the cardiac cycles.

Referring to FIG. 7, each image n of the sequence is provided with reference lines REF1, REF2 and with lines DP1, DP2 which represent the displacement of each point of the parietal boundaries at the instant n.

Referring to FIGS. 3 and 4, the subsystems 100 and 200 have computation means which are of the same kind, however applied on signals which are different. For this reason, a subsystem 400 is proposed in the place of subsystems 100 and 200, for receiving the same inputs, performing the same functions and providing the same outputs.

Figure 5:
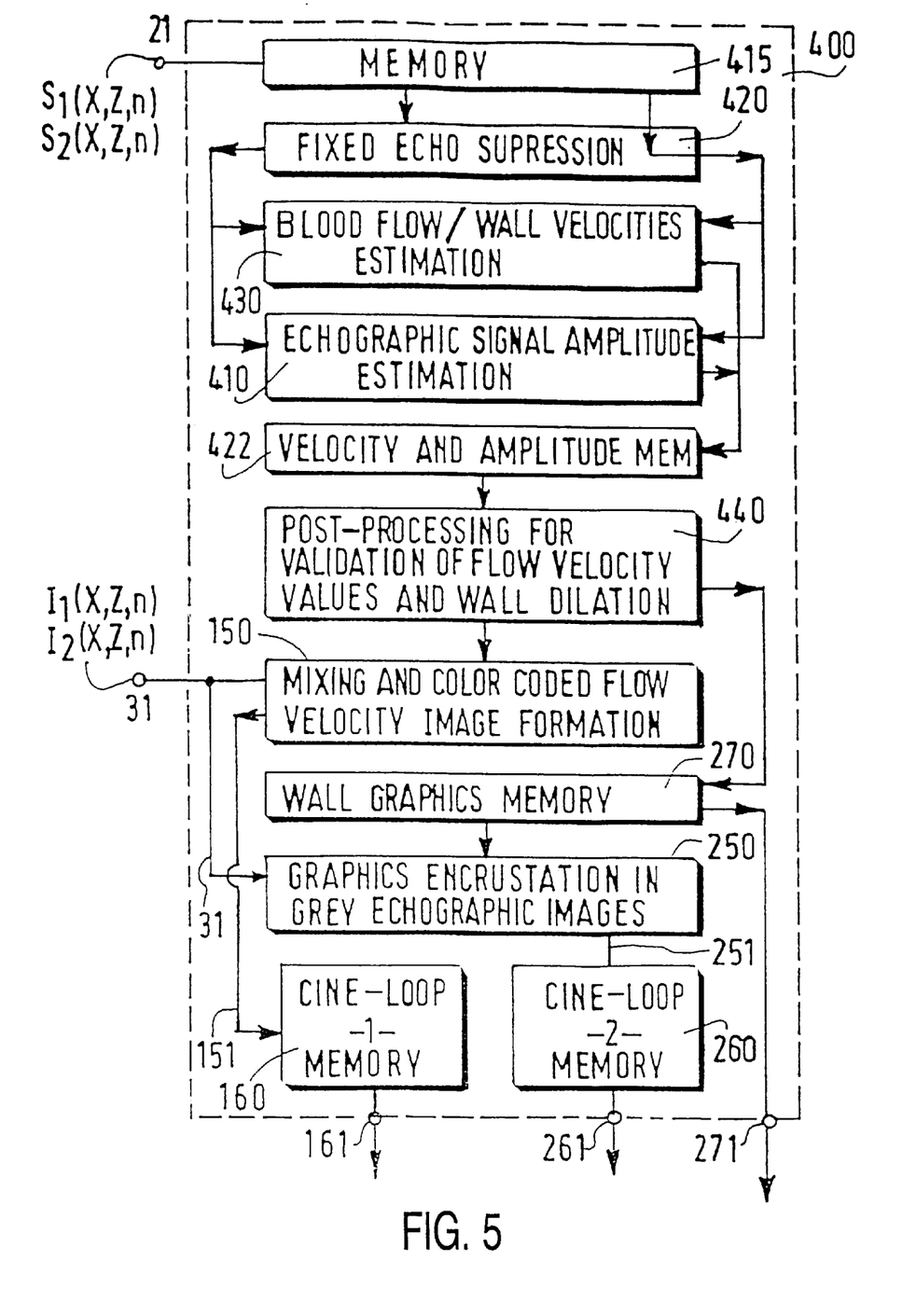
FIG. 5 shows a functional block diagram of a subsystem of the echographic system combining the functions of the first and second subsystems.

Referring to FIG. 5, the subsystem 400 comprises a memory 415 available at the input of a velocity estimation stage 430. The memory 415 receives alternatively the echographic signals 21 noted $S_1(X,Z,n)$ and $S_2(X,Z,n)$ issued by the emitter/receiver stage 20 and provides the appropriate delay between two correlated signals.

The memory 415 provides the signals to a fixed echo suppression stage 420 which is activated only in the case of blood flow velocity processing. This stage 420 is transparent for the signals in the case of wall velocity processing.

The signals issued by the fixed echo suppression stage 420 are provided in each case of velocity processing to the velocity estimation stage 430, and to an echographic signal amplitude estimation stage 410.

The velocity estimation stage 430 provides either the blood flow velocity $V_1(X,Z,n)$ or the wall velocity $V_2(X,Z,n)$, and the amplitude estimation stage 210 provides the corresponding images of amplitude $A_1(X,Z,n)$ or $A_2(X,Z,n)$. The velocities $V_1(X,Z,n)$ or $V_2(X,Z,n)$ and the amplitudes $A_1(X,Z,n)$ or $A_2(X,Z,n)$ are stored in a memory 422 to the fetched and provided at the input of the post-processing stage 440 for validation of flow velocity values or estimation of the wall dilation according to the case of signals processed.

Then the stage 150 forms a sequence of images by mixing color coded flow velocity data with the echographic intensity images $I_1(X,Z,n)$ provided by stage 30 (FIG. 2). The sequence 151 of color coded images formed in stage 150 are stored in the memory 160 labelled CINE-LOOP-1.

Now the data 271 for forming graphic lines according to arterial wall movements are issued by the post-processing stage 440 and stored in a memory 270 of wall graphics to be fetched if necessary. These data may also be provided together with the intensity images 31 noted $I_2(X,Z,n)$ to the graphic superimposition stage 250 for forming a sequence of images having graphic lines superimposed in the echographic grey images. This sequence of image is then stored in the memory 260 labelled CINE-LOOP-2.

So in this sub-system 400, the fixed echo suppression stage 420 performs the function of stage 120 of sub-system 100; the velocity estimation stage 420 performs either the function of stage 130 or of stage 230 depending on which signals are processed; the amplitude estimation stage 420 performs the function of stage 110 or 210; and the memory 422 performs the function of memory 122 or 222. Then the POST-PROCESSING stage 440 performs either the function of the discrimination and validation stage 140, or the function of wall dilation estimation depending on which signals are processed.

Figure 6:
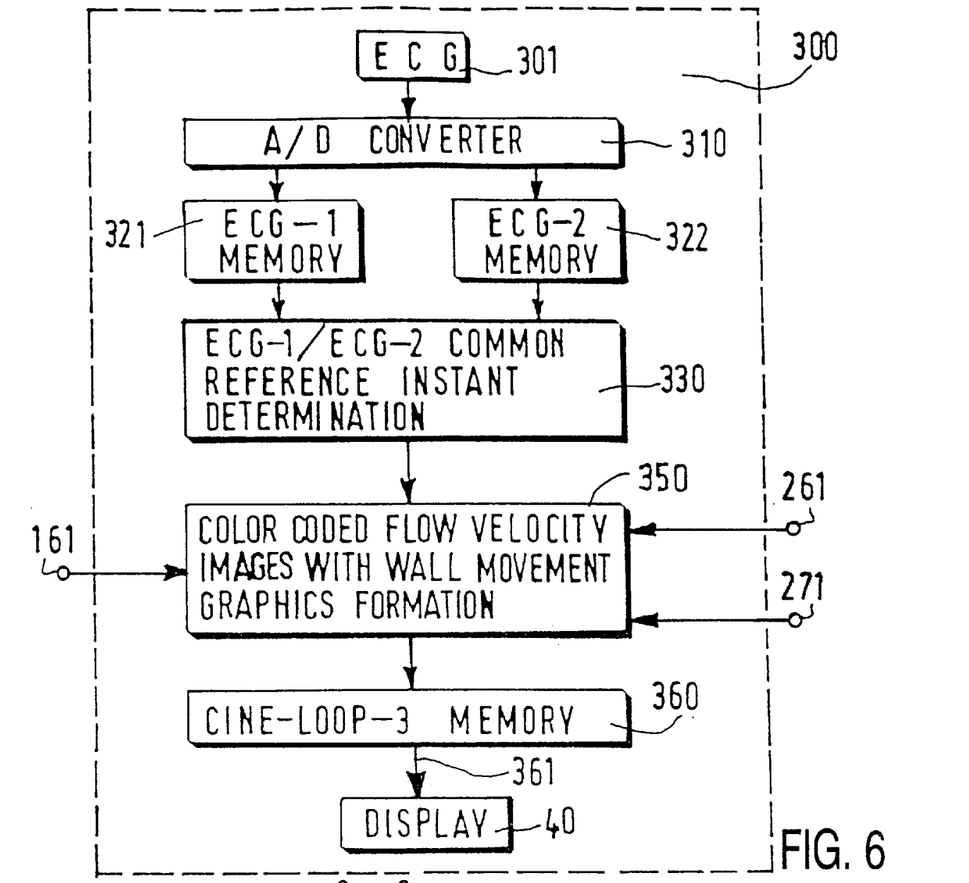
FIG. 6 shows a functional block diagram of a last subsystem of said echographic system for synchronising and displaying images constructed from WM and CVI image data.

Referring to FIG. 6, a subsystem 300 performs the synchronisation of the first sequence of images at a first rate stored in CINE-LOOP-1 and of the second sequence of images at a second rate stored in CINE-LOOP-2. As an alternative the data stored in the wall graphics memory 270 may be used instead of the data stored CINE-LOOP-2.

The subsystem 300 comprises means for acquiring a first set of ECG data synchroneously to the acquisition of the first set of data for processing color velocity at said first rate for example of about 30 images per second. Now a second set of ECG data is acquired synchroneously to the acquisition of the second set of data for processing wall velocity graphics, at said second rate for example of about 200 images per second.

The data acquired by an electrocardiograph 301 are A/D converted in a conversion stage 310 providing the two appropriate sets of ECG data labelled ECG1 in the case of blood flow velocity processing and ECG-2 in the case of wall graphics processing, which are stored in memories 321 and 322 respectively.

These two sets of ECG data are further issued from said memories 321 and 322 and provided to a stage 330 for determining a common reference instant thus permitting to match the images issued from CINE-LOOP1 and from CINE-LOOP-2 and to superpose these images in an image formation stage 350 for providing a sequence of color coded flow velocity images having superimposed wall movement graphics which are subsequently stored in a memory CINE-LOOP-3. The image sequence which is stored in CINE-LOOP-3 may be formed at a third rate with respect to the first and second sequences of CINE-LOOP1 and CINE-LOOP-2 but is formed preferably at the lower rate of the two rates of acquisition of data, for example 30 images per second, which is sufficient for display.

During the display of the sequence by the display device 40, the physician can qualitatively and quantitatively evaluate the distortions or non-distortions of the graphic lines simulating the displacements of the walls together with the blood flow velocity which is color coded. The physician may derive therefrom the presence and the seriousness of stenosis, or elasticity defects, linked to the arterial walls of the subjacent blood flow velocity image. The visualisation of the arterial dilation in real time, together with the blood flow velocity nevertheless delayed by the time necessary so as to enable identification of the instants corresponding to the starts of the cardiac cycle and also synchronisation of the two sets of image sequences, also enables optimisation of the position of the echographic probe so as to obtain a cross-sectional plane which passes through the arterial axis parallel to OX (FIG. 7).

The invention has been described in relation to the processing of echographic signals, but can also be applied to the processing of signals of a different nature: electric, electromagnetic, etc.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A signal processing method comprising:
   acquiring a first and a second set of data formed from signals respectively relating to first and second moving parts of an object having moving parts, and
   constructing on the basis of said first and second sets of data a sequence which is called the sequence of color velocity images with graphics and which is formed from a sequence of intensity images in which said intensity images are provided with color coded representations of velocity zones of said first moving parts and with schematic graphic representations reproducing the movements of said second moving parts.

2. A method according to claim 1 further comprising:
   constructing on the basis of said first set of data a first sequence of velocity images which is formed from a first sequence of intensity images of the object in which the intensity images are provided with color coded representations of velocity zones of the first moving parts of the object,
   constructing on the basis of said second set of data a second sequence of velocity images which is formed from a second sequence of intensity images of the object in which the intensity images are provided with schematic graphic representations reproducing the movements of the second moving parts,
   determining a common event occurring periodically during the acquisition of the first and second sets of data respectively, and synchronizing said first and second sequences of velocity images on the basis of said common event, and
   wherein the step of constructing said sequence of color velocity images with graphics comprises mixing the first and second synchronised sequences of velocity images.

3. A method as claimed in claim 2, in which the schematic graphic representations represent the second moving parts of the object in reference positions in coincidence with said common event, and in amplified movements at a given amplification scale.

4. A method as claimed in claim 2 wherein the sequence of color velocity images with graphics comprises N images and wherein the object comprises an organ having first and second moving parts:
   and wherein said acquiring said first set of data is performed periodically at a first rate resulting in a first series of a first number $N_1$ ($1 \leq N_1$) of echographic signals ($S_1$ ($X,y,n_1$); $1 \leq n_1 \leq N_1$) relating to said first moving parts of the organ,
   and wherein said acquiring said second set of data 1 performed periodically at a second rate resulting in a second series of a second number $N_2$ ($1 \leq N_2$) of echographic signals ($S_2(X,Y,n_2)$, $1 \leq n_2 \leq N_2$) relating to said second moving parts of the organ,
   and wherein said determining said common event comprises acquiring electrocardiograms at said first and second rates simultaneously with the acquisitions of said first and second sets of echographic data respectively, the common event being determined as an instant of a similar phase of the first and second electrocardiograms, and
   wherein said synchronizing the first and second velocity image sequences comprises selecting first and second start images from said first and second velocity image sequences, respectively, at the instant of said common event.

5. A method as claimed in claim 4, in which the organ comprises a segment of an artery, which is explored along its longitudinal axis, the first moving parts of said organ represented by colored zones coding velocity are the different zones of the blood flowing inside said arterial segment, the second moving parts of said organ represented by the schematic graphics comprising graphic lines are the internal parietal boundaries of said arterial segment, and the common event is the start of the cardiac cycle whereby the schematic graphic representation of the second moving parts include reference positions which are straight lines corresponding to the minimum of dilation of the arterial segment.

6. A method as claimed in claim 5,
   wherein said constructing of a first sequence of color coded blood flow velocity images comprises
   constructing a first sequence of intensity images representing the organ on the basis of said first series of echographic signals acquired at a first rate,
   suppressing fixed echoes and echoes considered fixed including echoes emitted by the walls of the arterial segment,
   estimating blood flow velocity and corresponding signal amplitude,
   discriminating and validating blood flow velocity values,
   color coding velocity values and mixing the color coded velocity values of blood flow with intensity image data to form a first sequence of color coded blood flow velocity images, called the first velocity image sequence,
   storing said first velocity image sequence in a first memory, and
   wherein said constructing of a second sequence of velocity images representing graphics reproducing the arterial wall movement comprises
   constructing a second sequence of intensity images representing the organ on the basis of said second series of echographic signals acquired at the second rate,
   storing the echographic signals in a memory,
   estimating wall velocity and corresponding signal amplitude,
   post-processing for arterial wall dilation estimation,
   constructing graphic lines reproducing the internal arterial wall movements,
   mixing and superimposing the graphic lines in the images of the second sequence of intensity images to form the second sequence of velocity images with superimposed graphics, called the second velocity image sequence, and
   storing said second velocity image sequence in a second memory.

7. A method according to claim 6, wherein said acquiring electrocardiograms comprises storing the first and second electrocardiograms acquired respectively at the first and second rates,
   wherein said determining a common event further comprises selecting an event common in said first and second electrocardiograms, and
   wherein said synchronizing the corresponding images of the first and second velocity image sequences on the basis of this common event further comprises (i) mixing the data of the first and second velocity image sequences to construct a third sequence of images, at a third rate, formed from blood flow velocities which are color coded on corresponding intensity images and which are superimposed with graphic lines reproducing schematically the internal arterial walls in the reference position at the start of the cardiac cycle and graphic lines representing schematically said internal arterial wall movements during the phases of the cardiac cycle, called the third sequence of color velocity images with graphics, and (ii) storing said sequence at the third rate in a memory,
   and wherein the method further comprises displaying said third sequence.

8. A method according to claim 1 comprising:
   constructing on the basis of said first set of data a first sequence of velocity images which is formed of a first sequence of intensity images of the object in which the intensity images are provided with color coded representations of velocity zones of the first moving parts of the object,
   constructing on the basis of said second set of data a second sequence of sets of velocity data for forming schematic graphic representations reproducing the movement of the second moving parts of the object, said second sequence of sets of velocity data being called the second velocity image sequence,
   determining a common event occurring periodically during the acquisition of the first and second sets of data respectively, and synchronizing said first sequence of velocity images and said second sequence of sets of velocity data on the basis of said common event, and
   wherein the step of constructing said sequence of color velocity images with graphics comprises superimposing the schematic graphic representations of the second sequence of sets of velocity data in the images of the first sequence of velocity images.

9. The method of claim 8 wherein the sequence of color velocity images with graphics comprises N images and wherein the object comprises an organ having first and second moving parts:
   and wherein said acquiring said first set of data is performed periodically at a first rate resulting in a first series of a first number $N_1$ ($1 \leq N_1$) of echographic signals ($S_1$ $(X,y,n_1)$; $1 \leq n_1 \leq N_1$) relating to said first moving parts of the organ,
   and wherein said acquiring said second set of data is performed periodically at a second rate resulting in a second series of a second number $N_2$ ($1 \leq N_2$) of echographic signals ($S_2(X,Y,n_2)$, $1 \leq n_2 \leq N_2$) relating to said second moving parts of the organ,
   and wherein said determining said common event comprises acquiring electrocardiograms at said first and second rates simultaneously with the acquisitions of said first and second sets of echographic data respectively, the common event being determined as an instant of a similar phase of the first and second electrocardiograms, and
   wherein said synchronizing the first and second velocity image sequences comprises selecting first and second start images from said first and second velocity image sequences, respectively, at the instant of said common event.

10. The method of claim 9 in which the organ comprises a segment of an artery, which is explored along its longitudinal axis, the first moving parts of said organ represented by colored zones coding velocity are the different zones of the blood flowing inside said arterial segment, the second moving parts of said organ represented by the schematic graphics comprising graphic lines are the internal parietal boundaries of said arterial segment, and the common event is the start of the cardiac cycle whereby the schematic graphic representation of the second moving parts include reference positions which are straight lines corresponding to the minimum of dilation of the arterial segment.

11. The method of claim 10 wherein said constructing of a first sequence of color coded blood flow velocity images comprises
   constructing a first sequence of intensity images representing the organ on the basis of said first series of echographic signals acquired at a first rate, suppressing fixed echoes and echoes considered fixed including echoes emitted by the walls of the arterial segment, estimating blood flow velocity and corresponding signal amplitude, discriminating and validating blood flow velocity values, color coding velocity values and mixing the color coded velocity values of blood flow with intensity image data to form a first sequence of color coded blood flow velocity images, called the first velocity image sequence, storing said first velocity image sequence in a first memory, and wherein said constructing of a second sequence of velocity images representing graphics reproducing the arterial wall movement comprises constructing a second sequence of intensity images representing the organ on the basis of said second series of echographic signals acquired at the second rate, storing the echographic signals in a memory, estimating wall velocity and corresponding signal amplitude, post-processing for arterial wall dilation estimation, constructing graphic lines reproducing the internal arterial wall movements, mixing and superimposing the graphic lines in the images of the second sequence of intensity images to form the second sequence of velocity images with superimposed graphics, called the second velocity image sequence, and storing said second velocity image sequence in a second memory.

12. The method of 11 wherein said acquiring electrocardiograms comprises storing the first and second electrocardiograms acquired respectively at the first and second rates, wherein said determining a common event further comprises selecting an event common in said first and second electrocardiograms, and wherein said synchronizing the corresponding images of the first and second velocity image sequences on the basis of this common event further comprises (i) mixing the data of the first and second velocity image sequences to construct a third sequence of images, at a third rate, formed from blood flow velocities which are color coded on corresponding intensity images and which are superimposed with graphic lines reproducing schematically the internal arterial walls in the reference position at the start of the cardiac cycle and graphic lines representing schematically said internal arterial wall movements during the phases of the cardiac cycle, called the third sequence of color velocity images with graphics, and (ii) storing said sequence at the third rate in a memory, and wherein the method further comprises displaying said third sequence.

13. An ultrasonic apparatus including a diagnostic tool for carrying out a signal processing method comprising means for acquiring a first and a second set of data formed from signals respectively relating to first and second moving parts of an organ having moving parts, means for constructing on the basis of said first and second sets of data a sequence which is called the sequence of color velocity images with graphics and which is formed from a sequence of intensity images in which said intensity images are provided with color coded representations of velocity zones of the first moving parts and with schematic graphic representations reproducing the movements of the second moving parts, and means for displaying said sequence of color velocity images of the organ.

14. An ultrasonic apparatus according to claim 13, wherein the organ comprises a segment of an artery having moving blood as a first moving part and a moving arterial wall as a second moving part, the apparatus further comprising means for acquiring at a first and second rates a first and a second set of data formed of a first and a second sets of echographic signals respectively relating to the first and the second moving parts of the organ means for constructing a first and a second sequence of intensity images of said organ on the basis of said data, stages for acquiring a first and a second set of data of electrocardiograms at said first and second rates simultaneously with the acquisition of said first and second sets of echographic data respectively, a sub-system for processing the first set of echographic signals comprising (i) a stage for the suppression of fixed echoes and echoes considered fixed, including echoes emitted by the walls of the arterial segment, (ii) a blood flow velocity estimation stage, (iii) an image formation stage for mixing of color coded velocity values of blood flow with intensity image data to form a first sequence of color coded blood flow velocity images, called the first velocity image sequence, and (iv) a first memory for storing the first sequence, a sub-system for processing the second set of echographic signals comprising (i) a post-processing stage for arterial wall dilation estimation and for construction of graphic lines reproducing the internal arterial wall movements, (ii) an image formation stage for forming a second sequence of velocity images with superimposed graphics, called the second velocity image sequence, and (iii) a second memory for storing the second sequence, a stage for synchronizing corresponding images of the first and second velocity image sequences at the first and second rates on the basis of a common event, said common event being selected as a similar instant in the first and second electrocardiograms, and means for mixing the synchronized data of the first and second velocity image sequences to construct a sequence of images at a third rate formed of blood flow velocities which are color coded on corresponding intensity images and which are superimposed with graphic lines reproducing schematically the movements of the internal arterial walls during the phases of the cardiac cycle, called the sequence of color velocity images with graphics.

* * * * *